United States Patent
Freimuth et al.

[15] 3,696,594
[45] Oct. 10, 1972

[54] STROKING JACK SHAFT FOR A BELT DRIVE

[72] Inventors: John H. Freimuth, New Holland; Joseph C. Hurlburt, Leola, both of Pa.

[73] Assignee: Sperry Rand Corporation, New Holland, Pa.

[22] Filed: July 7, 1971

[21] Appl. No.: 160,289

[52] U.S. Cl. ................56/15.2, 56/15.8, 56/15.9
[51] Int. Cl. ............................................A01d 35/26
[58] Field of Search............56/11.6, 15.1, 15.2, 15.3, 56/15.8, 15.9, 6

[56] References Cited

UNITED STATES PATENTS

| | | | |
|---|---|---|---|
| 2,991,612 | 7/1961 | Holmes | 56/6 X |
| 3,508,386 | 4/1970 | Borchardt et al. | 56/15.9 |
| 3,461,654 | 8/1969 | Plamper | 56/11.6 |

*Primary Examiner*—Louis G. Mancene
*Assistant Examiner*—J. N. Eskovitz
*Attorney*—John C. Thompson et al.

[57] ABSTRACT

A rotatively driven stroking jack shaft having first and second axially spaced sheaves fixed thereto and drivingly interconnected by a pair of endless V-belts to a driving and driven sheave respectively, the driven sheave being disposed on a vertically floating mower unit and drivingly interconnected to the cutting elements thereof. The jack shaft is rotatively mounted within a housing that is supported by a linkage structure that is operatively connected and moveably responsive to the vertical floatation of the mower unit such that substantial misalignment between the drive belts and respective connected sheaves is avoided.

8 Claims, 4 Drawing Figures

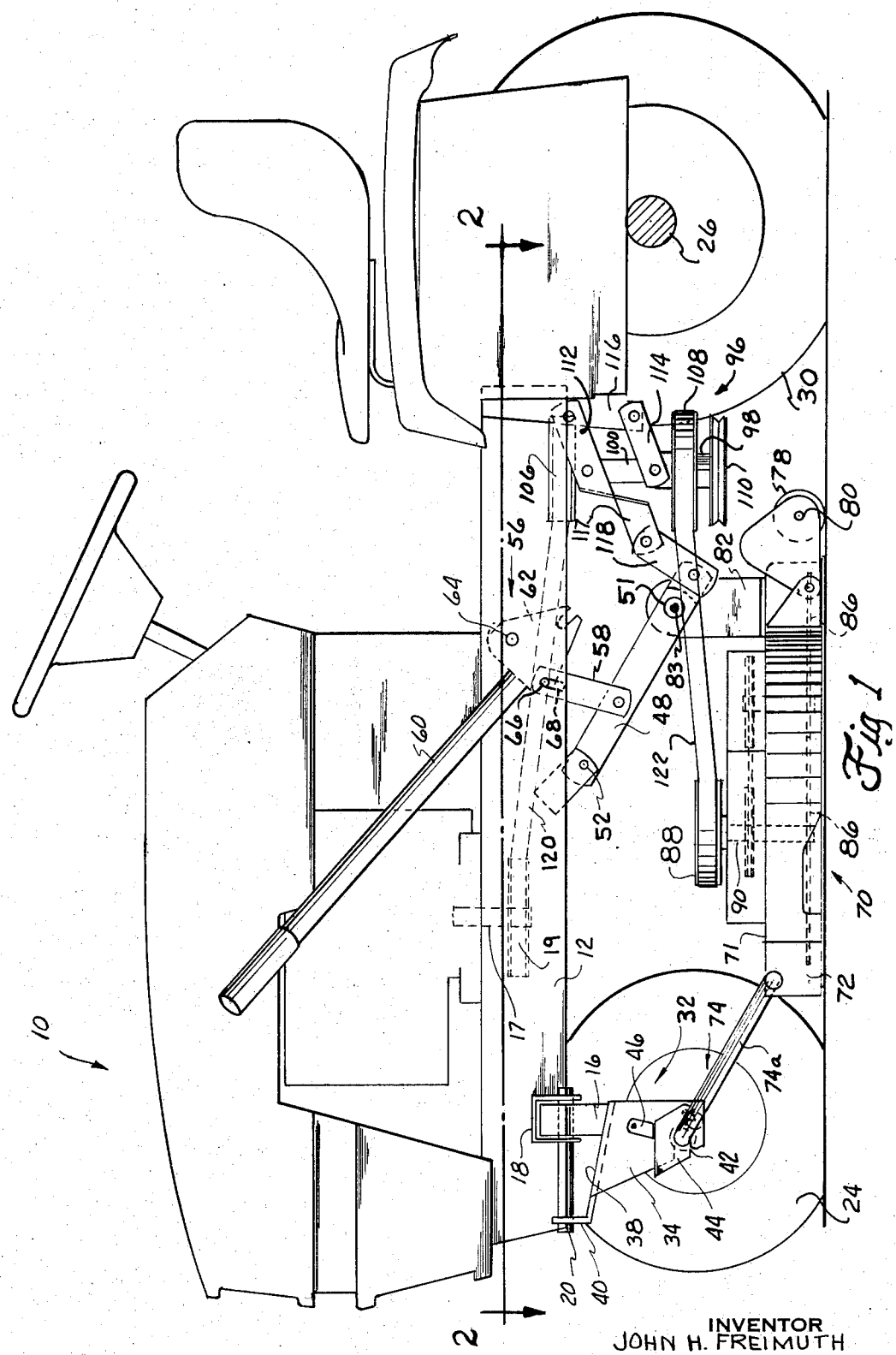

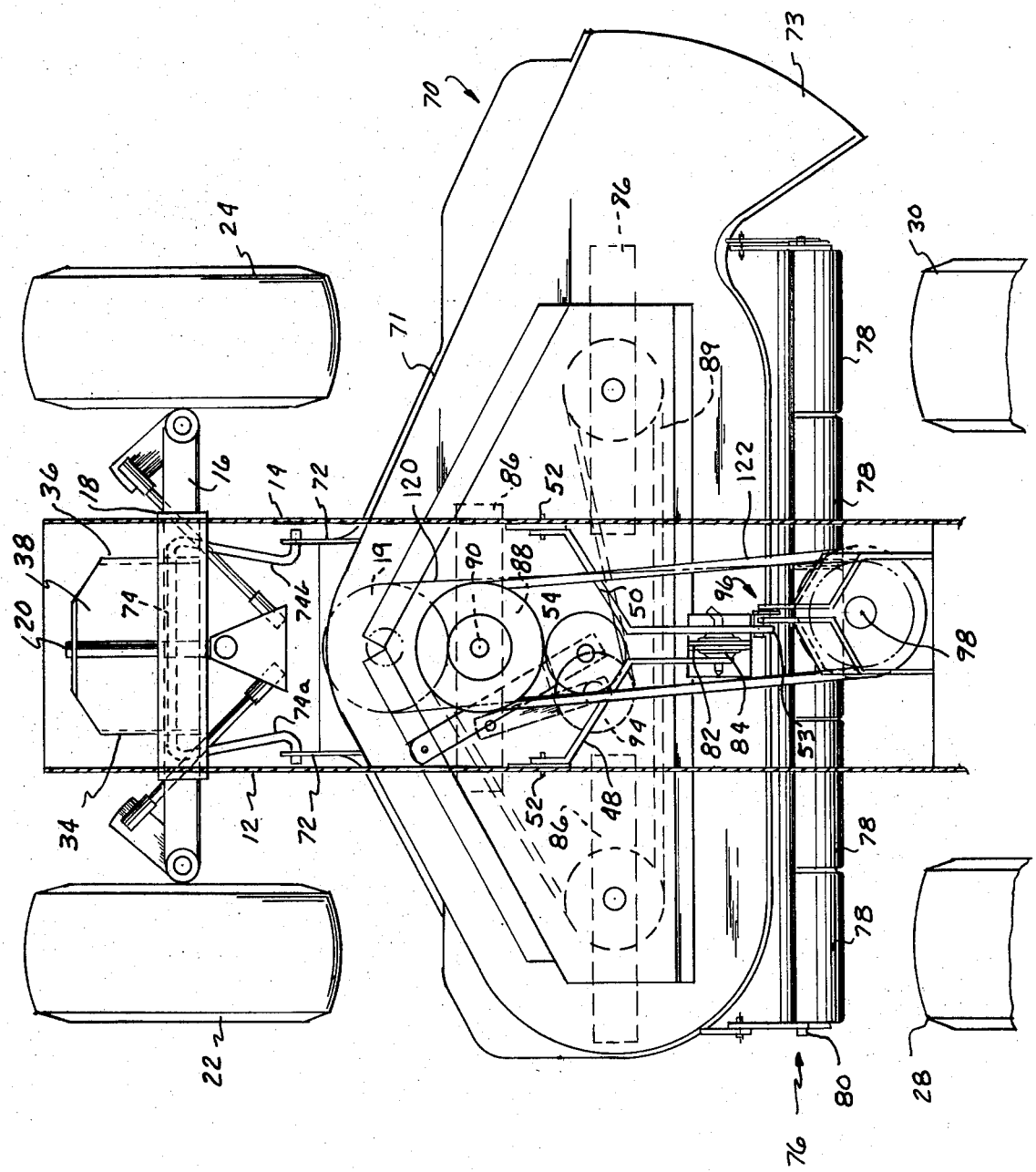

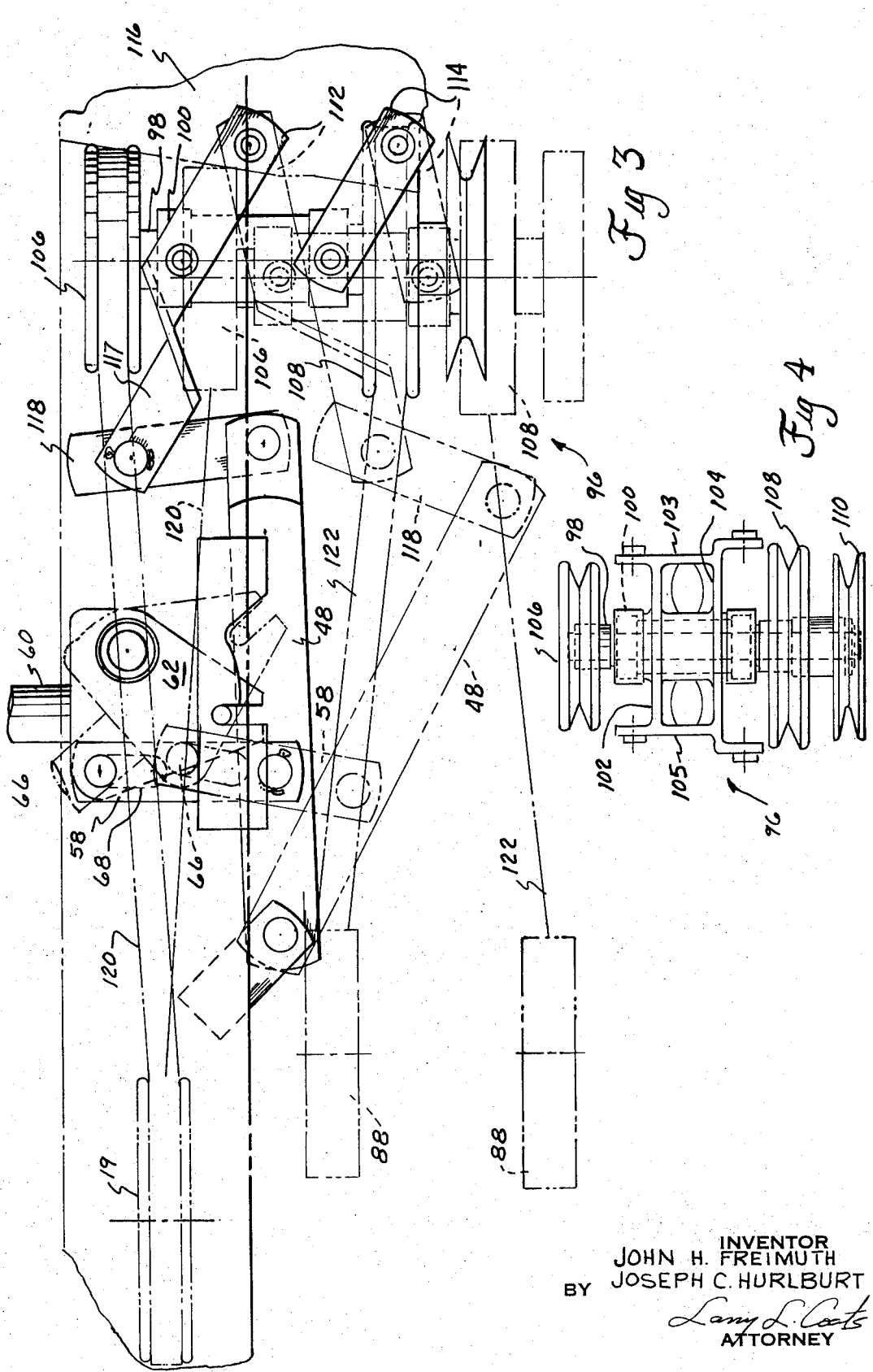

STROKING JACK SHAFT FOR A BELT DRIVE

BACKGROUND OF THE INVENTION

This invention relates to mower drives and more particularly to a belt drive for driving the cutting elements of a floating mower.

Over the past years belt drives have found extensive application in farm machinery as a means for power transmission. This wide acceptance is due, in part at least, to the fact that belt drives are economical and lend themselves to a variety of design situations. However, belt drives are not free of deficiencies. One such deficient area has been severe wear and consequently short belt life where two successive drivenly interconnected sheaves are substantially misaligned.

Although belt misalignment is a problem in many design areas, mower drives have particularly been susceptible to this problem due in major part to their floatation characteristics. Such belt misalignment problems are especially present in the lawn and garden tractor field where, in many instances, a mower unit is tractively coupled beneath the main frame of the tractor such that it floats up and down relative to the main frame of the tractor. One example of such a lawn and garden tractor with a mower attachment is shown in U.S. Pat. No. 2,972,850 to M. S. Ariens et al. From a review of the disclosure in this patent, it is noted that as the mower unit floats up and down over various ground undulations the driven sheave mounted thereon moves up and down in a general horizontal plane relative to a stationary driving sheave which depends from the main frame of the tractor. As the mower unit moves over these various undulations, the driving belt interconnecting these two sheaves moves through various angles of misalignment. As previously pointed out, this misalignment, if pronounced, results in severe belt wear that is reflected in reduced life.

SUMMARY OF THE INVENTION

Applicants have provided a stroking jack shaft for transmitting the torque of driving sheave to a driven sheave mounted on a floating mower unit tractively coupled beneath the chassis structure of a tractor. The stroking jack shaft of the present invention is supported by a dual four bar linkage arrangement that is responsive to the floating movement of the mower unit for maintaining a driving belt interconnecting the driven sheave on the mower unit with a driving sheave on the jack shaft in relative close alignment, or expressed in another way, for preventing substantial misalignment between the driven sheave of the mower deck and the driving sheave of the stroking jack shaft.

It is therefore the principal object of the present invention to provide a belt drive with a jack shaft moveable in response to the movement of a connected sheave for adverting substantial belt misalignment.

It is also a primary object of the present invention to provide a stroking jack shaft for transmitting torque to at least one moveable sheave and to provide means interconnecting the jack shaft and the moveable sheave for actuating the jack shaft in response to the movement of the moveable sheave such that a degree of belt alignment is maintained.

Another object of the present invention is to provide a stroking jack shaft having first and second sheaves fixed thereto drivingly interconnected to a stationary driving sheave and a moveable driven sheave respectively, and to provide a responsive linkage structure interconnecting the stroking jack shaft with the moveable driven sheave such that the stroking jack shaft moves in response to the movement of the driven sheave in such a manner that the first sheave of the jack shaft moves up and down through the plane of the stationary driving sheave approximately an equal angle to each side and that the moveable driven sheave moves up and down through the plane of the stroking second sheave approximately an equal degree on each side, thereby tending to minimize belt misalignment between the respectively drivingly interconnected sheaves of the belt drive described.

These and other objects and advantages of this invention will be apparent to those skilled in the art after a consideration of the following detailed description, taken in conjunction with the accompanying drawings in which a preferred form of this invention is illustrated.

BRIEF DESCRIPTION OF THE DRAWINGS

FIG. 1 is a side elevational view of a lawn and garden tractor having a mower unit tractively coupled beneath the belly thereof and drivingly interconnected to the tractor power source by the stroking jack shaft of the present invention.

FIG. 2 is a plan view taken through the line 2—2 of FIG. 1.

FIG. 3 is an enlarged fragmentary view of the stroking jack shaft showing the relationship between a driving driven sheave as the stroking jack shaft moves through the range of floatation.

FIG. 4 is a fragmentary side elevational view showing the housing structure of the stroking jack shaft.

In the following description right-hand and left-hand reference is determined by standing to the rear of the tractor and facing the direction of travel.

DESCRIPTION OF THE PREFERRED EMBODIMENT

With particular reference to FIGS. 1 and 2, a lawn and garden tractor, indicated generally by the numeral 10, is shown therein and includes a chassis structure basically comprised of a pair of longitudinally extending leg members 12, 14. Mounted generally mid-way between the front and mid-portions of the chassis structure is a vertical crank shaft engine 15. The engine includes a downwardly extending output power shaft 17 that is rotatively driven about a vertical axis that extends downwardly between the two leg members 12, 14. Fixed to the lower end of the output power shaft 17 and rotatable therewith is a driving sheave 19.

Transversely extending between a lower cut-out portion of the leg members 12, 14 is an axle casing 18, the axle casing being welded within the chassis structure or fixed thereto by other suitable fastening means. Pivotally mounted within the axle casing 18 is a front axle 16 secured therein by a longitudinally extending pivot rod 20. Rotatively mounted on opposite ends of the axle 16 are a pair of wheels indicated by numerals 22, 24. It is noted from FIG. 2 that the wheels are steered through a drag linkage arrangement which extends between a pivot plate and a pair of radius arms. Mounted to the lower intermediate portions of the axle 16, just below the front chassis structure, is an inverted U-shape attachment support generally indicated by numeral 32. This attachment support basically comprises a pair of laterally spaced, downwardly depending legs 34, 36. The upper portions of the attachment support includes a base 38 extending generally between the upper portions of the legs 34, 36 and a flange 40 which extends upwardly from the base and is pivotally mounted about the front portion of the pivot rod 20. With particular reference to FIG. 1, it is seen that each leg 34, 36 includes a curled opening 42 in the lower portion thereof for receiving an attaching linkage of a particular attachment. Each leg is further provided with a pivoting latch 44 that tends to close the opening 42 and a lock 46 for securing the pivoting latch in a lock position.

With reference to the rear of the chassis structure, it is seen from FIGS. 1 and 2 that a rear transversely extending axle 26 is provided therein. Rotatively mounted on opposite sides of the rear axle 26 are a pair of wheels indicated by numerals 28, 30.

The chassis structure is further provided with a lifting linkage structure for raising and lowering belly mounted attachments such as rotary lawn mowers. More particularly, the lift linkage associated with the tractor 10 of the present disclosure is comprised of a pair of links 48, 50. These links are pivotally connected about a transversely extending axis by a pair of pivot pins 52. Each link extends generally inwardly and rearwardly from the points of pivotal connection with the chassis to a central region generally mid-way between the leg structures 12, 14, and then bend rearwardly towards the rear of the tractor, with the rear portions of the links 48, 50 disposed in general parallel relationship as best seen in FIG. 2. The rear parallel portions of links 48, 50 include transverse aligned openings 51 for receiving an attachment link from the particular belly mounted attachment. It is noted that the rear portion of link 50 includes an extension 53 which extends beyond the rear end of the corresponding link 48. The significance of this extension will be described subsequently.

The lift linkage just described is actuated up and down between a transport and ground engaging position by a lift mechanism indicated generally by numeral 56 (FIG. 1). With particular reference to the lift mechanism 56 it is seen that a plate 62 is pivotally connected to the left channel member 12 by a pivot pin 64 and is pivotal thereabout by an elongated handle 60. The plate 62 and lift links 48, 50 are interconnected by a connecting link 58, the connecting link 58 including a lost motion or floating slot 68 which is confined about a stud 66 which is fixed to and extends from plate 62.

Tractively coupled beneath the belly of the tractor 10 is a mower unit, indicated generally by numeral 70. The mower unit is basically of a conventional design in that it is comprised of a housing 71 with a discharge area 73 through which the cut material may be propelled. Interconnecting the front portion of the mower unit 70 and the tractor 10 is a generally U-shape front draft link 74. The U-shape front draft link includes a pair of legs 74a, 74b in which the ends thereof are curled through openings in a pair of laterally spaced front mounting brackets 72 that extend from the mower housing 71. The base 74c of the front draft linkage is confined within the curled openings 42 of the attachment support 32.

Mounted across the rear of the mower unit 70 is a series of ground engaging rollers 78 that are rotatively mounted in side by side relationship about a transversely extending axle 80. Although not particularly shown, the ground engaging rollers are provided with an adjustment mechanism for varying their disposition relative to the mower unit 70. This adjustment mechanism serves as a means for adjusting the height of grass cut.

Mounted to the top rear center portion of the mower housing 71 is a rigid mounting bracket 82. The top portion of the rear mounting bracket 82 includes a ball joint attaching assembly 84 that is connected to links 48, 50 by a pin 83.

Disposed within the mower housing 71 are a series of cutting elements 86, each cutting elements being of the rotary type and fixed to a particular shaft that is driven by a belt 89 (FIG. 2). The present disclosure shows three laterally spaced blades 86a, 86b, 86c fixed to and rotative with a like with a like member of vertical shafts, each of which is rotatively disposed in the top of mower housing 71. Belt 89 is trained around three sheaves, each fixed to a respective shaft, and an idler 92 is provided to maintain proper tension on the belt such that continuous torque is applied to each of the blades.

The power for rotating the cutting elements 86 is provided by a driven sheave 88 fixed to and rotative with a shaft 90 that is bearinged in a front central portion of the mower housing 71.

Power is transmitted from the driving sheave 19, disposed just below the vertical crank shaft engine 15, by a stroking jack shaft, indicated by numeral 96 generally. With particular reference to the jack shaft 96, it is seen that a vertical shaft 98 is rotatively mounted within a housing 100, as shown in FIG. 3. It is noted from FIG. 4 that the main body of the housing 100 is carried by a support structure including laterally extending upper and lower arms 102, 104, respectively. The arms 102, 104 are joined about their outer ends by a side structure consisting of side members 103, 105.

Axially spaced on the jack shaft 98 is a series of sheaves, a first upper sheave 106 a second lower sheave 108 and a third auxiliary sheave 110 that is fixed to the lower end of the jack shaft. The housing 100 and associated carrying structure 102, 103, 104, 105 is supported by a dual four bar linkage arrangement comprising corresponding pairs of laterally spaced upper and lower links indicated by numerals 112, 114 respectively. Depending downwardly from the tractor chassis structure, rearwardly of the mower unit 70, is a rear attaching structure 116. As best seen in FIG. 1, the rearmost ends of the parallel four bar linkage carrying the stroking jack shaft are pivotally connected to this rear attaching structure 116. It is seen that the front ends of the lower links 114 are pivotally connected to a lower portion of the housing support structure, while the more lengthy upper links 112 are connected intermediately to the upper portion of the housing and associated carrying structure. The forward most portion of the upper links 112 are bent downwardly to form a connecting extension 117 which is connected to the extension 53 of lift link 50 by a coupling link 118. Moreover, it should be pointed out that the upper and lower links 112, 114 are disposed in parallel relationship and that the longitudinal distance between the respective points connecting the jack shaft housing with the rear attaching structure 116 are of equal length, thereby making this dual four bar linkage a parallel one. It is further appreciated that as the mower unit 70 moves up and down the four bar linkage of the jack shaft will stroke the jack shaft accordingly, but not necessarily in direct proportion thereto. The drive is completed by the provision of a driving belt 120 drivingly interconnected between the driving sheave 19 and the first sheave 106 of the jack shaft and a driven belt 122 drivingly interconnecting the driven sheave 88 disposed on the mower unit with the second sheave 108 of the stroking jack shaft.

As the mower unit moves over various ground irregularities, the mower unit 70 is maintained in a plane approximately parallel to the chassis structure. During this movement, the dual four bar linkage arrangement carrying the jack shaft 96 moves with the mower unit but as previously pointed out the corresponding movement of the jack shaft is not in direct proportion to the movement of the mower unit. This is best illustrated in FIG. 3 showing the stroking jack shaft 96 in solid lines at its maximum floatation position and in dotted lines in its minimum floatation position. The distance between the maximum floatating position and the lower minimum position of the driven sheave 88 defines generally the range of mower floatation.

With particular reference to FIG. 3, it is seen that when the mower unit and associated driven sheave is in the maximum position (solid lines) that the first sheave 106 on the jack shaft lies in a horizontal plane above the stationary driving sheave 19. Also it is noted that the driven sheave 88 likewise lies in a horizontal plane slightly above the corresponding plane of the second sheave 108. Thus at this point there is misalignment between the respective connected sheaves but this misalignment is within the degree that is tolerable with respect to belt wear. As the mower unit moves from its maximum floatation position to its lower floatation position, it is seen that the upper sheave 106 moves downwardly through the plane of the stationary driving sheave 19 and once the driven sheave 88 is in its lower position the first sheave is now disposed in a horizontal plane spaced below the corresponding plane of the stationary driving sheave 19. It is noted that the angle of misalignment between the two sheaves 19, 106 is approximately the same at both extremities of the jack shaft stroke. In similar fashion, as the mower unit 70 moves from its maximum floatation position to the minimum position it is seen that the driven sheave 88 moves downwardly through the moving plane of the second sheave 108. But as in the case of the upper sheaves, the angle of misalignment between the lower connected sheaves 108, 88 is approximately the same at both extremities of the jack shaft stroke.

Thus functionally speaking, it is seen that the jack shaft of the present invention is a compromising or balancing factor in maintaining belt alignment within the present mower drive. It is noted that there is some misalignment but the particular linkage arrangement of the mower unit and the jack shaft is designed to maintain the degree of misalignment within tolerable limits.

What is claimed is:

1. A belt drive comprising a moveable support, a driven sheave rotatably mounted on said support and moveable therewith, a rotatably mounted driving sheave fixed relative to said driven sheave, a jack shaft having first and second sheaves drivingly interconnected to said driving and driven sheaves respectively by a pair of belts, and linkage means operatively interconnecting said jack shaft with said moveable support for moving said jack shaft in response to the movement of said support to avoid substantial belt misalignment between the respective connected sheaves.

2. A belt drive, as recited in claim 1, wherein said jack shaft is rotatively mounted within a housing supported by said linkage means, said linkage means comprised of a parallel four bar linkage arrangement.

3. A belt drive, as recited in claim 1, wherein said moveable support comprises a mower unit tractively coupled beneath a tractor.

4. A belt drive, as recited in claim 3, wherein said mower unit is suspended from said tractor by a linkage structure and wherein said linkage means and linkage structure interconnected.

5. In a mower drive system including a mobile frame structure having a power source associated therewith; a driving sheave rotatively driven by said power source; a mower unit linked to said mobile frame structure and adapted to float relative thereto in response to movement over ground undulations, said mower unit having cutting elements disposed therein; a driven sheave drivingly interconnected to said cutting elements and moveable with said floating mower unit; the improvement comprising: a drive aligning stroking jack shaft comprising a shaft having first and second sheaves drivingly interconnected to said driving and driven sheaves respectively by a pair of belts; a housing rotatively supporting said jack shaft; and floating linkage means operatively interconnecting said floating mower unit with said housing for moving said housing and jack shaft in response to the movement of said mower unit and driven sheave such that substantial belt misalignment between corresponding connected sheaves is adverted.

6. A mower drive system, as recited in claim 5, wherein the floating linkage means operatively interconnecting said floating mower unit with said housing includes a parallel four bar linkage arrangement.

7. A mower drive for a tractor comprising in combination: a tractor having a chassis including front and rear transversely extending axles having wheels rotatively mounted on opposite ends thereof; an engine mounted to said chassis and having a downwardly extending vertical output power shaft with a driving sheave fixed thereto; a mower unit tractively coupled to said chassis by a first floating linkage structure intermediately between said front and rear axles, said mower unit having cutting elements therein driven by a generally vertically extending drive shaft having a driven sheave fixed thereto, said driven sheave being vertically spaced beneath said driving sheave; a generally vertically disposed jack shaft having first and second axially spaced sheaves drivingly interconnected to said driving and driven sheaves respectively by a pair of endless belts, said jack shaft being rotatively mounted within a moveably mounted housing; and linkage means operatively interconnected between said mower unit and said housing and moveably responsive to floating movement of said mower unit for maintaining a degree of alignment between the respective belt connected sheaves.

8. A belt drive system for a mower unit tractively coupled to a tractor, comprising in combination::
  a tractor having a wheel supported chassis structure with a power source mounted therein;
  a driving sheave rotatively driven in a horizontal plane by said power source;
  a mower unit tractively coupled beneath said chassis by a first floating linkage structure and moveable between a lower position and an upper position as said mower unit moves over irregularities in the ground;
  means disposed in said mower unit for cutting;
  a driven sheave rotatively mounted on said mower unit and drivingly interconnected to said cutting means, said driven sheave being normally disposed in a horizontal plane spaced below said driving sheave and moveable relative thereto with said floating mower unit such that the space therebetween varies from a maximum when said mower unit is in the lower position to a minimum when said mower unit is in the upper position;
  a jack shaft rotatively mounted within a housing with its axis of rotation being generally disposed vertically so as to extend generally parallel with the axis of rotation of said driving and driven sheaves;
  upper and lower sheaves fixed to and axially spaced apart on said jack shaft a distance less than said maximum distance between said driving and driven sheaves;
  driving and driven belts interconnecting said upper and driving sheave and said lower and driven sheaves respectively; and
  a second linkage structure supporting said housing and jack shaft such that said upper and lower sheaves lie in horizontal planes between the horizontal planes of said driving and driven sheaves when said mower unit is in the lower position, said linkage structure being connected to said first floating linkage structure and responsive to the floating movement of said mower unit as it moves up and down between said upper and lower positions such that said lower sheave is correspondingly moveable up and down in horizontal planes between the maximum and minimum horizontal planes of said driven sheave and wherein said upper sheave is correspondingly moveable up and down an equal distance above and below said driving sheave, thereby balancing the misalignment between the respective connected sheaves.

* * * * *